United States Patent [19]

Childs

[11] Patent Number: 4,680,638
[45] Date of Patent: Jul. 14, 1987

[54] CONCEALMENT OF DEFECTS IN A VIDEO SIGNAL

[75] Inventor: Ian Childs, Sutton, England

[73] Assignee: British Broadcasting Corporation, London, England

[21] Appl. No.: 513,680

[22] Filed: Jul. 14, 1983

[30] Foreign Application Priority Data

Jul. 16, 1982 [GB] United Kingdom ............... 8220619

[51] Int. Cl.⁴ ........................................... H04N 9/04
[52] U.S. Cl. ..................................... 358/214; 358/54
[58] Field of Search ............... 358/214, 54, 113, 336, 358/213, 215, 216, 335; 360/38.1

[56] References Cited

U.S. PATENT DOCUMENTS

| 4,199,780 | 10/1978 | Taylor | 358/8 |
| 4,205,337 | 5/1980 | Millward | 358/54 |
| 4,250,521 | 2/1981 | Wright | 358/8 |
| 4,293,869 | 10/1981 | Scholz | 358/8 |
| 4,315,331 | 2/1982 | Lemoine et al. | 371/31 |
| 4,329,708 | 5/1982 | Yamamoto et al. | 358/36 |
| 4,361,853 | 11/1982 | Remy et al. | 358/167 |
| 4,398,224 | 8/1983 | Watanabe | 358/339 |
| 4,451,920 | 5/1984 | Hoshimi et al. | 371/40 |
| 4,473,850 | 9/1984 | Foerster et al. | 360/9.1 |
| 4,497,055 | 1/1985 | Hoshino et al. | 371/31 |

FOREIGN PATENT DOCUMENTS

| 1409153 | 10/1975 | United Kingdom . |
| 1594344 | 10/1977 | United Kingdom . |
| 1534486 | 12/1978 | United Kingdom . |
| 1547811 | 6/1979 | United Kingdom . |
| 2015294 | 9/1979 | United Kingdom . |
| 2033190 | 5/1980 | United Kingdom . |
| 2061666 | 5/1981 | United Kingdom . |

Primary Examiner—Robert G. Lev
Attorney, Agent, or Firm—Robert F. O'Connell

[57] ABSTRACT

Video signals (Y,U,V) from a telecine machine are accompanied by a blemish signal (D) (obtained for example by infra-red scanning of a color film) indicating the presence of scratches, dirt etc. This controls a switch (22) to substitute information from another part of the film (e.g. the previous frame, from a frame store 33). To prevent substitution with information also containing blemishes, the blemish signal in respect of the substitute information is made available (flag store 36) to suppress the substitution and switch to an alternative source such as a interpolator (31). The use of a movement detector, (not shown) to suppress substitution from another frame when motion occurs, is also described. The circuitry can be adapted for use in conjunction with a videotape dropout detector.

24 Claims, 9 Drawing Figures

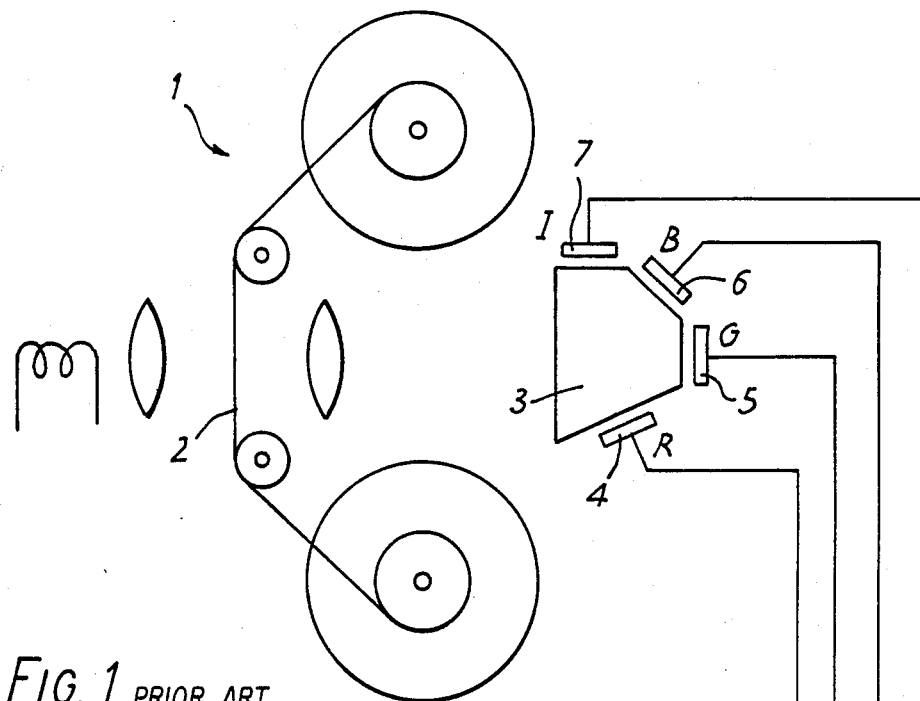
FIG. 1 PRIOR ART
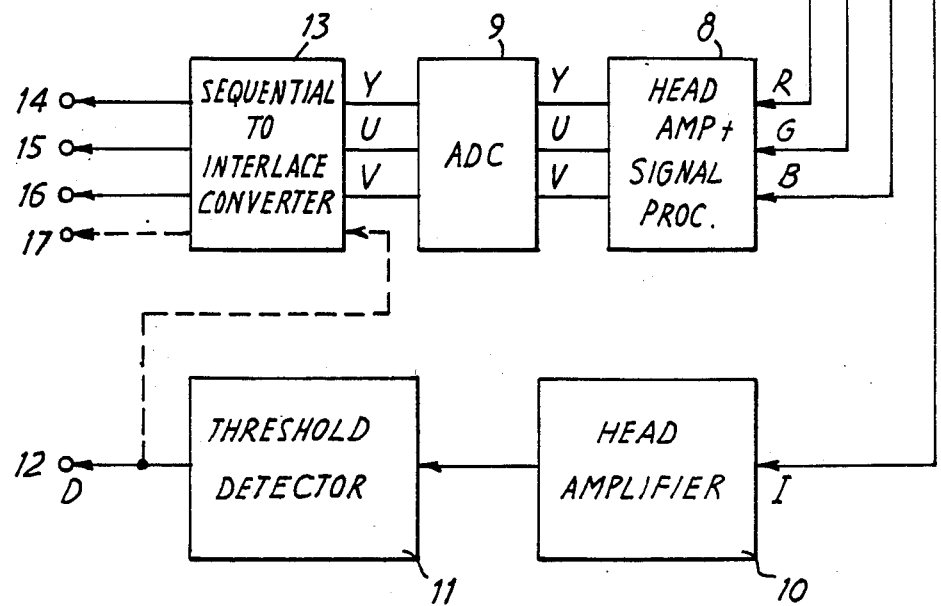

CONCEALMENT OF DEFECTS IN A VIDEO SIGNAL

The invention relates to the detection and concealment of defects in a video signal, such as film blemishes in the output of a telecine machine, or 'drop-outs' in the output of a video tape recorder.

Our U.K. Pat. No. 1409153 discloses blemish detecting and concealing equipment for a flying-spot telecine machine in which defects such as hairs, dust and scratches are detected by detecting light scattered by the film. The resulting signal is used to modify the video output by replacing the part of the picture containing the defect by a substitute piece of picture. This may come from a nearby area such as an earlier line or part of a line, or from an earlier frame. The system described in our U.K. Pat. Nos. 1547811 and 1547812 makes use of the fact that such defects, unlike colour film dyes, are generally opaque to infra-red light, and employ an infra-red sensor such as an infra-red camera tube to provide the control signal for substitution. They also recognise the need for "expansion" of the control signal to ensure coverage of the edges of the defect area.

The first proposal suffers from the disadvantage that no means is provided to guard against the possibility of replacement of the defect by a substitute piece of picture which itself contains defects. The second proposal utilises recursive concealment, that is, the substitute information is taken from the output of the apparatus, and involves the danger that the substitute information has been repeatedly substituted and may thus contain totally unrelated film information.

Moreover, in such equipment replacement information extracted from an earlier line can successfully conceal small blemishes but in the case of larger areas might result in substitution of unrelated information which was more objectionable than the original defect. Similarly, replacement by information extracted from an earlier frame is unsatisfactory near the edges of moving objects. Other alternatives are possible - for example the substitution could be made from the following frame instead of the previous one. The invention is concerned with apparatus for concealing defects in a video signal, comprising means responsive to signals supplied thereto to substitute into the video signals video signals corresponding to a different area of the image.

In one aspect of the invention, the apparatus includes means for making available defect signals corresponding to the said different area and when these indicate the presence of a defect thereon to suppress the said substitution.

In another aspect of the invention—where the different area is the same region of another frame, the apparatus includes a movement detector and means arranged upon the detection of movement to suppress the said substitution. Where the substitution is suppressed, an alternative substitute signal—e.g. obtained by interpolation—can be used instead.

The following description will be given with reference to the concealment of film blemishes in the output of the telecine machine.

Some embodiments of the invention will now be described, by way of example, with reference to the accompanying drawings, in which:

FIG. 1 is a block diagram of a known teleciné system including an infra-red blemish detector;

Figure 2:
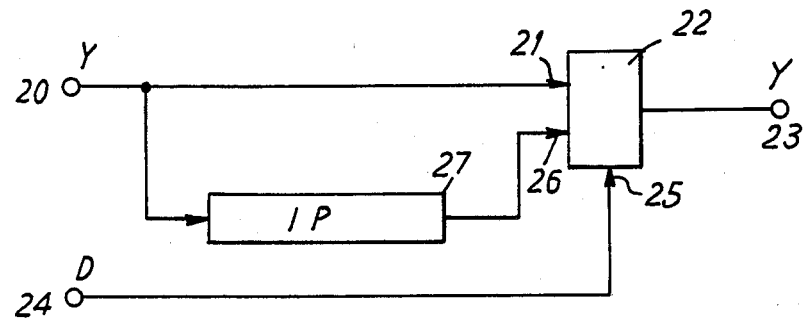
FIG. 2 is a block diagram of a known concealment apparatus.

The teleciné system of FIG. 1 comprises a conventional film projection system 1 which can cast an image of a ciné film 2 upon a beam splitter block 3. Four electromagnetic radiation sensors 4, 5, 6 and 7 in the form of CCD (charge-coupled device) line-array sensors are arranged around the splitter block 3 to detect the red, green, blue and infra-red portions R, G, B and I of the split beam. Vertical scanning is effected by continuous motion of the film 2, horizontal scanning being carried out by the line-array sensors under control of suitable scanning circuits (not shown).

The colour sensors 4, 5 and 6 are each connected to an input of a head amplifier and signal processing stage 8 which converts the colour signals at the inputs to two chrominance signals U and V and a single luminance signal Y which are then fed to an analogue-to-digital converter 9.

The blemish detecting infra-red sensor 7 is connected to a head amplifier 10 which produces a video signal representing the infra-red image of the film.

The transmission characteristics of the colour dyes used in present-day colour film are such that the infra-red radiation largely passes through the film unattenuated. The infra-red radiation is, however, stopped by dirt and, due to refraction and diffraction effects, by scratches also. Those portions of the signal which indicate the presence of imperfections are thus detected electrically by a threshold detector 11 which receives the video output of the head amplifier 10 and produces at its output 12a "dirt" or "blemish" signal D indicating the presence of a blemish on the surface of the film 2 when the input signal is above a preset level. This information can be used to substitute the affected areas of the picture by switching in some form of estimated picture information.

Since the film is scanned sequentially, the scanned luminance and chrominance signals Y, U and V from the analogue-to-digital converters 9 are connected to respective inputs of a digital sequential-to-interlace converter 13 which presents interlaced and possibly blemished video signals upon converter outputs 14, 15 and 16. The converter 13 consists mainly of a large digital store together with logic to generate address and housekeeping signals under control of a microprocessor.

The output 12 is also connected to the converter 13, and could be used to produce an interlaced blemish signal D at output 17 (shown dotted). Preferably, however (as will be seen below), the concealment apparatus is incorporated in the converter 13, which then produces "concealed" video on outputs 14, 15 and 16.

In one embodiment of the telecine system shown in FIG. 1 the infra-red channel can accept a band of wavelengths approximately 20 nm wide, centred on 850 nm. At these wavelengths cyan film dye has a slight effect on transmission of infra-red radiation and some masking of the signal at the head amplifier stage 10 is needed to cancel this out.

In use, the outputs 14, 15, 16 and 17 of this teleciné system can be connected to blemish concealing apparatus according to the present invention. For economy of storage, however, it is convenient to incorporate the concealment apparatus in the sequential-to-interlace converter 13, as in some of the embodiments of concealment apparatus now to be described.

FIG. 2 shows the concealment arrangement described in our U.K. Pat. No. 1409153 (monochrome only), in which the video (luminance) signal Y on video input 20 is fed to a first input 21 of a selector switch 22 and thence to the video output 23 of the apparatus. A blemish flag signal D applied to input 24 is connected to a control input 25 of the switch: when this signal indicates the existence of an imperfection in the picture, the switch is changed over to its second input 26 to receive the input video signal delayed by a delay device 27. As shown, this is one picture delay, providing for substitution of the corresponding area of the previous frame.

Figure 3:
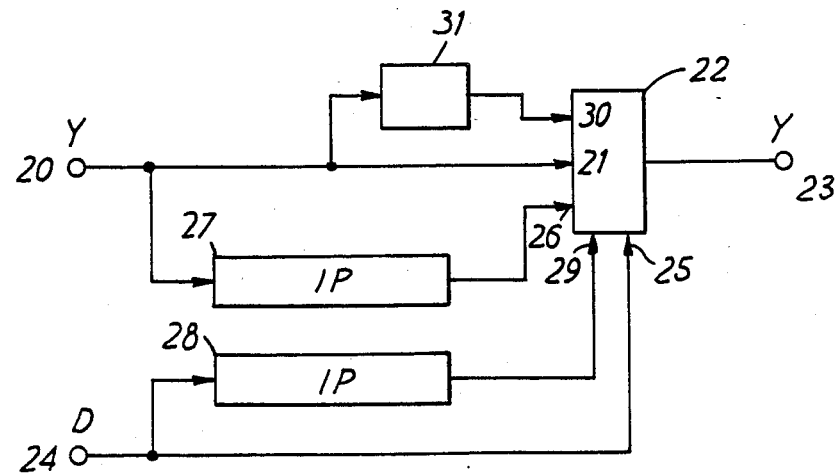
FIG. 3 is a block diagram of one embodiment of concealment apparatus according to the present invention.

FIG. 3 shows such an arrangement modified in accordance with the present invention, in which a further one picture delay 28 is employed to make available a blemish "flag" signal corresponding to the previous frame, to a second control input 29 of the selector switch 22. When a blemish is detected on the current frame, this signal, which indicates that the corresponding part of the previous picture is also imperfect, is employed to suppress the substitution of the previous picture area. Although in principle the apparatus could do merely that, allowing the original defect to pass uncorrected, preferably substitution is made, of an alternative signal, for example (as shown) by supplying to a third input 30 of switch 22 signals from an horizontal interpolator 31 arranged to interpolate the current signal across the defect. The interpolator 31 will of course necessitate additional delays in the signal path so that it has available information as to the video signal to the right of the defect: for clarity, however, these are not shown. Other alternatives are possible—for example the substitution could be made from the following frame instead of the previous one. Although described in terms of substitution of part of a previous frame, the arrangement of FIG. 2 can, with appropriate modification, be applied to systems where the substitute information is taken from any earlier or later picture or field or earlier or later lines of the current picture, or earlier or later parts of the current line.

Figure 4:
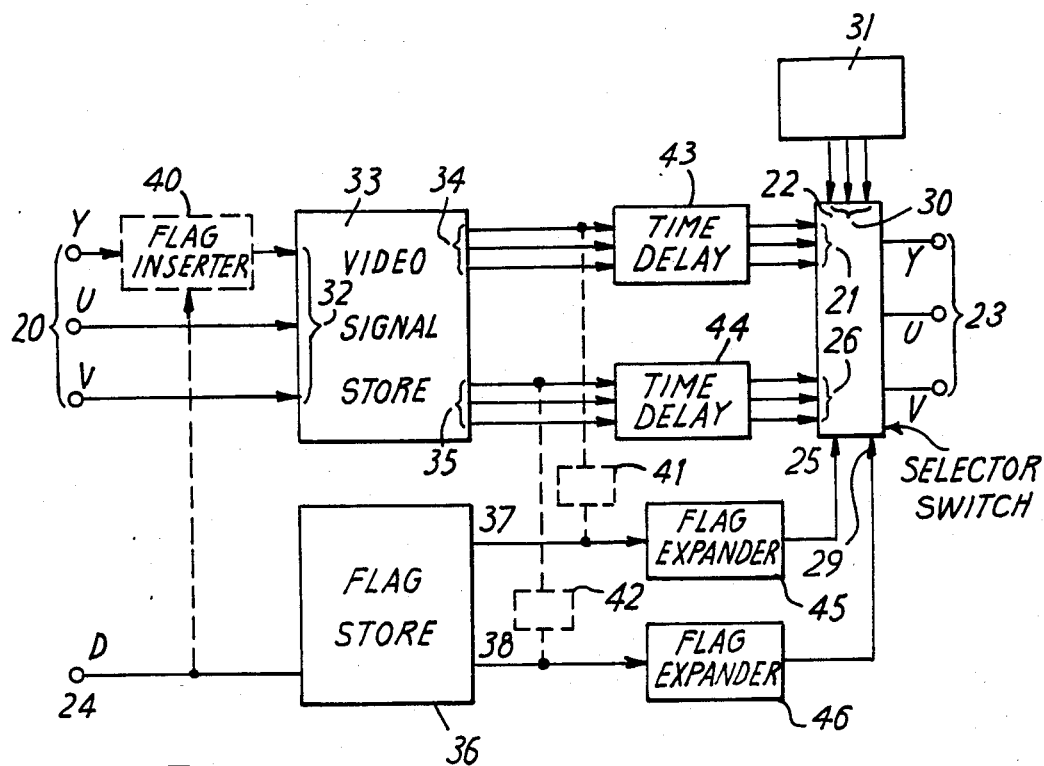
FIGS. 4, 5 and 6 are block diagrams of further embodiments of concealment apparatus.

Whilst the above-described embodiment serves to illustrate the principle of the invention, FIG. 4 shows a more practical arrangement. for colour operation the input 20 and output 23 include terminals for chrominance signals U, V, in addition to the luminance signal Y. The luminance and chrominance inputs are connected to write terminals 32 of a video signal store 33. This forms part of the sequential-to-interlace converter 13 of the telecine apparatus of FIG. 1 and has control circuitry (not shown) for ensuring appropriate timing of the writein and read-out of the signals. The converter circuitry may also be arranged to convert the scan rates of the signals from the telecine to the required output standard, as described in our co-pending U.K. patent application No. 41390/78 (Ser. No. 2007935).

The store 33 has a first access point 34 for reading out a "current" video signal, and a second access point 35 for reading out an earlier video signal; in this embodiment, the output from the second read point derives from an identical position on the frame previous to the "current" frame.

The blemish signal may pass through a flag store 36 operated in the same manner, with current and previous frame outputs 37, 38. Alternatively (as shown in dotted lines), a flag may be stored in the video store itself by insertion (flag inserting circuit 40) in place of the luminance signal Y, a code reserved for the indication of a blemish—for example binary number 0000 0000 could be reserved, the analogue-to-digital converter 9 being arranged to ensure that this number is never used for valid video information. The flag can then be extracted at the store outputs by flag detectors 41, 42.

In addition, the flag signals output from the store are expanded, so that the area flagged as blemished overlaps the area detected as such. This is achieved in each of the two channels by delays 43, 44 of slightly more than one line duration, in the video path so that the flag signal occurs in advance (in both horizontal and vertical directions) of the corresponding video, and by expansion circuits 45, 46 which extend the flag duration, again in both directions. These expansions of the flag prevent the appearance of a blemish halo around replaced information which may build up due to the inability of the threshold detector 11 to detect weak blemish signals from, for example, partially transparent dirt at the edges of a large blemish, which are below the threshold level. Such expansion is the subject of our U.K. Pat. No. 1547812.

As before, the selector switch 22 has first and second inputs 21, 26 connected to outputs of delays 43, 44 and a third input 30 for receiving an alternative video signal generated using information from a nearby area of the current frame (e.g. interpolator 31). This is particularly useful in the case of scratches. The control inputs 25, 29 of the switch are connected to the outputs of flag expanders 45, 46. Normally the "current" video signals at input 21 are switched through to the outputs 23 of the apparatus. If, however, the blemish flag signal control input 25 indicates the presence of a blemish, input 26 is selected instead, replacing areas of the frame affected by dirt with a correction derived from the previous frame. If, however, blemish signals occur simultaneously at both inputs 25, 29 of the switch, indicating that both frames are corrupted, the switch 22 is caused to switch to its third input 30.

The scratch-concealing embodiments shown in FIGS. 3 and 4 can include an additional movement interpolating stage in which the selector switch 22 is replaced by an interpolator controlled to give a lap dissolve between film frames. Should a blemish occur on a film frame then the interpolator is switched to ignore that frame while the dirt lasts. If the blemish occurs on both frames reversion to an external function may be necessary.

Figure 5:
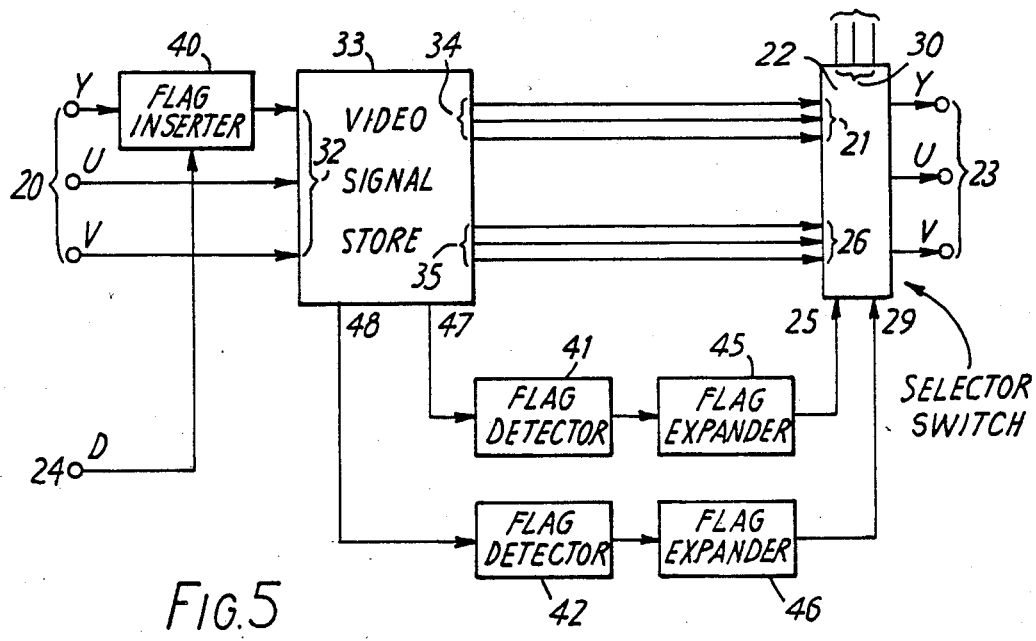

The arrangement shown in FIG. 4 has the disadvantage of expanding the flag vertically over adjacent lines of the current field, and an improved arrangement, shown in FIG. 5 has, in lieu of the delays 43, 44, additional outputs 47, 48 from the video store 33 whereby the advanced flag signals are obtained one or more picture lines in advance.

The embodiments shown in FIGS. 3, 4 and 5 could be modified to adapt the concealment function generated by external means and received at the third input of the selector switch in accordance with motion on the film. The pattern of movement in the region immediately surrounding a blemish could be detected, stored and used to change the function. A motion detector of the type described in our U.K. patent application No. 12972/78 or European Application No. 4728 could be used for this purpose. Similarly, scratches could be identified by the presence of a blemish signal of short duration on consecutive lines and the function adapted accordingly.

Figure 6:
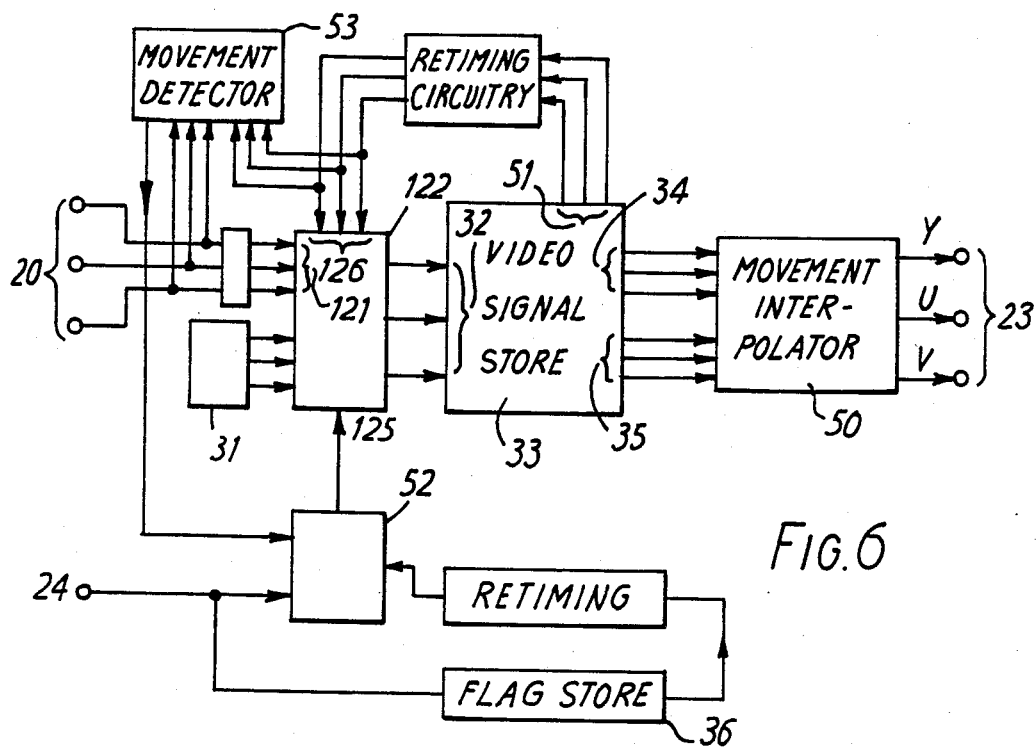

FIG. 6 shows an alternative recursive, concealment apparatus with three video input terminals 20 connected to a first video signal input 121 of a selector switch 122 whose output terminals are connected to inputs 32 of a video signal store 33. Two read access points of the store 33 are connected to a movement interpolator 50 which supplies video signal output 23. A further store output terminal 51 is connected, via retiming circuitry, to a second switch input 126.

In use, the switch 122 transfers unblemished video signals direct to the store 33. However, switch control input 125 responds, via control logic 52, to receipt of a blemish signal at input 24 to select a retimed, earlier video signal present at the switch input 126 for transfer to the store 33. Therefore, only corrected information is stored. Hence all video store locations contain valid video information and the flag is stored in the flag store 36, as described above. Blemish expansion is provided but not shown in the drawing. Because the system is recursive, there is no danger of substitution with blemished information. The flag store output (relating to the previous picture) indicates whether the relevant area of the previous picture was blemished; if so this implies that the store now contains substitute information and the flag is, as before, utilised to suppress substitution so that the substitute information is not re-cycled. Instead, an alternative substitute source, such as interpolator 31 is switched in. It is observed that this arrangement carries out substitution on the sequential signal (before sequential to interlace conversion) so that special measures for blemish expansion over adjacent picture lines corresponding to the interlace field are not required.

It has been observed that the substitution of "previous picture" information is unsatisfactory where movement occurs, and a movement detector 33 is also included which compares the current and previous frames and, if movement is detected, the control logic 52 is controlled to again suppress such substitution and use the alternative substitute signal source (interpolator 31) instead. This feature may also be provided in the apparatus of FIGS. 3, 4 and 5.

Figure 7:
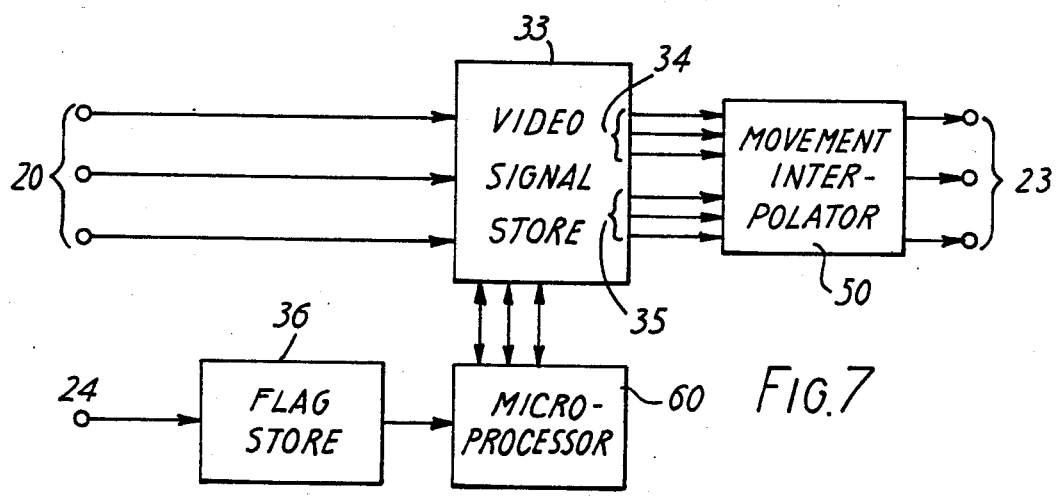
FIG. 7 is a block diagram of another concealment apparatus, employing a microprocessor.

FIG. 7 shows a microprocessor-based system. Here, the input video signals Y, U, V are entered directly into the video store 33 and are processed, as it were, in situ before being read out in interlace form by the associated control circuitry (not shown).

The processing is carried out by a microprocessor 60 which has read-write access to the video store 33 and also read access to the flag store 36, into which the dirt flag signal has been entered as described above. Essentially the microprocessor reads the flag store until it identifies a blemished area (flag set): it then calculates those picture elements requiring substitution of information (a process equivalent to the flag expansion procedure of the hardware concealers described above). It then checks the flag store locations in respect of the corresponding area of the previous picture to establish that that area is unblemished; it may also compare the picture elements adjacent the blemished region in the two consecutive pictures to verify that no movement has occurred. If both these conditions are satisfied, the microprocessor reads out the relevant parts of the adjacent picture from the video store, and writes them into the locations of the video store corresponding to the blemished area of the current picture. Otherwise it generates alternative substitute information by interpolation. Horizontal or vertical interpolation may be used, or it may be arranged that the microprocessor examines the shape of the blemish to establish whether it is generally vertical (tall and thin) or horizontal (short and wide) and to select horizontal or vertical interpolation, respectively, as being the more appropriate: or a two dimensional interpolation procedure may be employed.

It will be appreciated that the microprocessor will be subject to a speed limitation, and that it may not be feasible, with current technology, to provide all the above features with the arrangement shown in FIG. 6. It will be observed, too, that the microprocessor is operating in real time and thus it may, in the case of heavily blemished film, become overloaded in that it is not able to process all the blemishes in the duration of one picture period. This represents a danger of catastrophic failure, with complete concealment over only part of the picture.

Consideration of the required video flow between the video store and the microprocessor system indicates that, as a typical worst case condition, from 11 to 15 blocks of video samples must be read from and written to the video store in order to conceal one small speck of dirt. Assuming a store access time of 1 $\mu$s per block, the maximum number of dirt samples that can be concealed in any one film frame is, ignoring data processing time, about 4000. It is thought that very dirty film could contain more than this number of dirt samples (which is equivalent to dirt obscuring approximately $\frac{2}{3}\%$ of the active film area).

To alleviate this problem, a two stage approach is proposed. A first stage of concealment (for example, horizontal interpolation) removes the blemishes but is of course subject to its own inherent limitations. This is followed by a second stage e.g., of previous frame substitution (where this is permissible having regard to the factors of previous frame dirt and movement, as discussed above).

Figure 8:
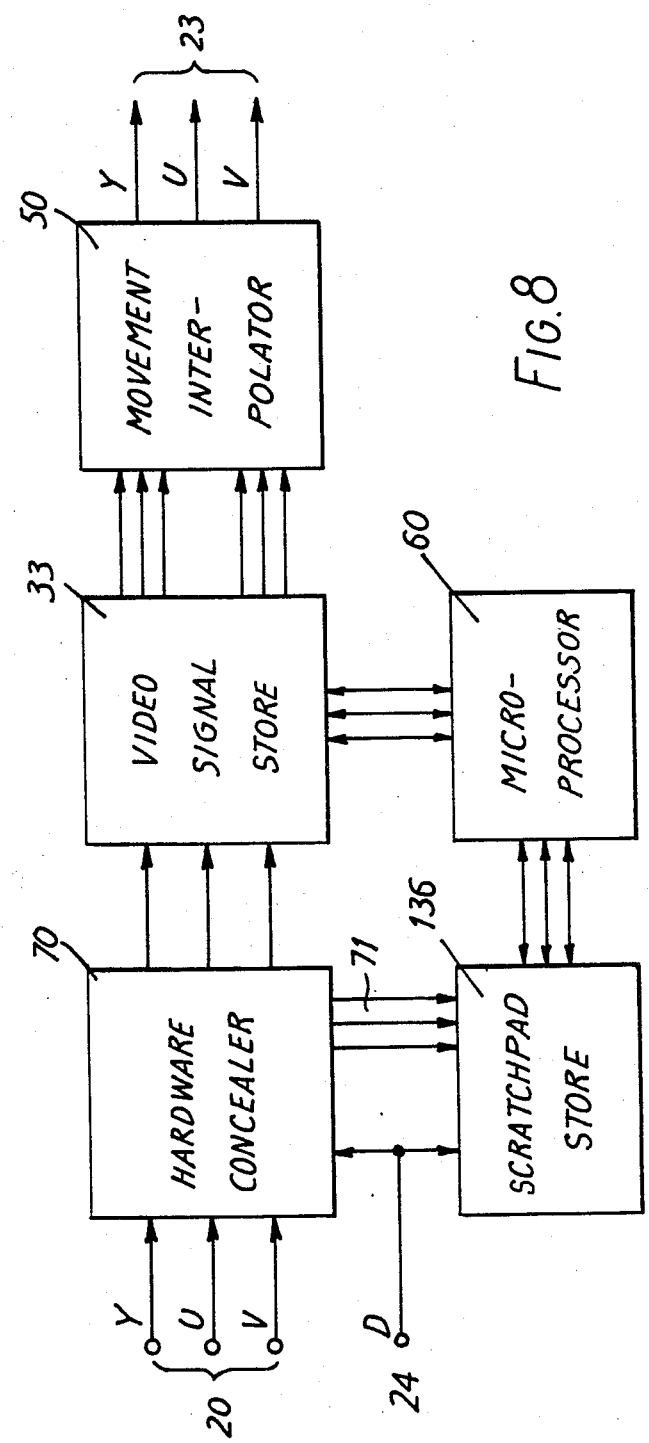
FIG. 8 is a block diagram of a two-stage concealment apparatus.

This could be achieved in the microprocessor system of FIG. 7 using a two pass approach, with the microprocessor carrying out interpolation across the blemishes over the entire frame, before moving on to the second pass for the second stage concealment. In this way a degree of concealment is ensured in virtually all cases. However, this has the disadvantage of increasing the amount of processing required by the microprocessor to carry out the complete procedure, and a preferred arrangement is shown in FIG. 8. This employs a separate hardware concealer for the first stage.

The hardware concealer 70 responds to the dirt flag signal D to perform a simple horizontal interpolation across each corrupted area before the video signals are stored in the video store 33. This has the advantage of not requiring additional access points into the video store 33. A scratched store 136 performs the function of the flag store 36 and may also receive from the concealer 70 (via data lines 71) video signals in the region of each blemish, so as to reduce the amount of data which the microprocessor must read from the video store. The microprocessor system 60 operates as described above with reference to FIG. 7. If there is more dirt than the microprocessor system can handle, the system is "failsafe" in that the first stage concealment remains.

Figure 9:
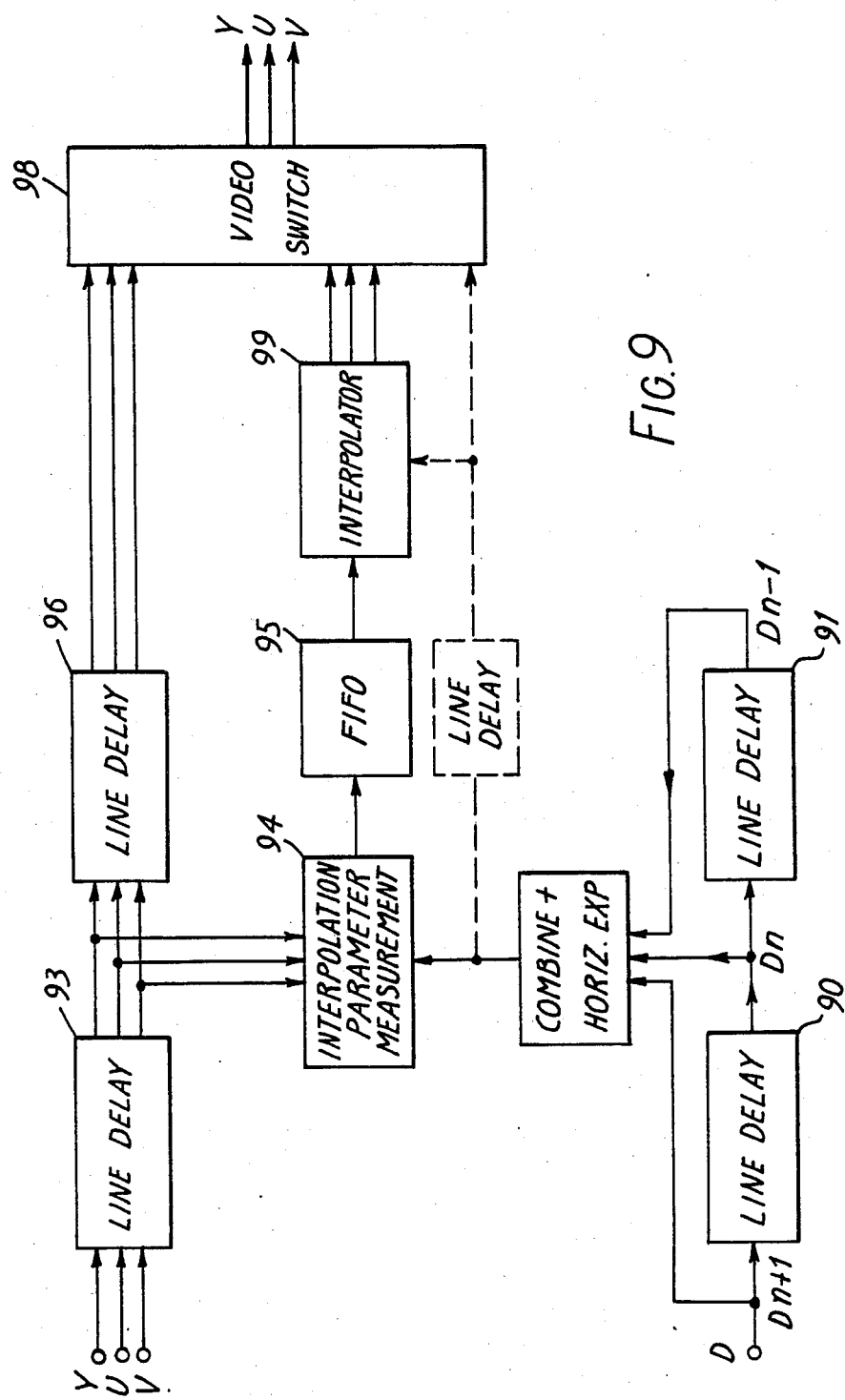
FIG. 9 is a block diagram of the hardware concealer of FIG. 8.

FIG. 9 is a block diagram of a suitable first stage concealer. Flag expansion is effected by line delays 90, 91 and a combiner/horizontal expansion unit 92. This provides vertical expansion by producing a flag signal whenever a flag is found on the next ($D_{n+1}$), current ($D_{n-1}$) line. The video channel has a compensating line delay 93.

Horizontal expansion is as previously described, the line delay 90 being slightly less than one line, for leftward flag expansion. The interpolation parameters (i.e. the values of the samples horizontally adjacent to the blemish, and the coordinates of the blemish) are extracted from the video signals by an interpolation parameter measurement unit 94, and buffered in a firstin, first-out buffer 95 before being supplied to the interpolator 99. The video channel has a compensating delay 96. The selector switch 98 switches between input video and the interpolator output under control of the expanded dirt flag signal. Instead of buffering the blemish coordinates in the buffer 95, the interpolator may respond to the (delayed) flag signal itself (connection shown dotted).

The examples given could be modified for use with a videotape recorder (VTR) to provide concealment of dropout errors. This is particularly suitable for a digital VTR. In this case, the blemish detector would be replaced by a dropout detector, of suitable known construction. In this case, a sequential picture is not, of course, available, so that the processing would operate solely on the interlaced video signal. A videotape recorder is likely to have fewer errors than a telecine, so that the limitations applying to processing time, noted above, would probably not apply.

What is claimed is:

1. A telecine machine provided with apparatus for concealing defects in an input video signal from said machine, said apparatus comprising:
   input means for receiving an input video signal representing a film area of a film frame;
   video store means coupled to said input means for storing the input video signal to provide a stored video signal representing a different film area;
   blemish signal deriving means for deriving a first blemish signal indicating the presence of a blemish on the film area represented by the input video signal;
   blemish signal storing means for storing the first blemish signal to provide a stored blemish signal associated with the stored video signal; and
   selection means for providing an output video signal in dependence upon said first blemish signal and said stored blemish signal, said selection means being operative such that:
   in the absence of said first blemish signal the input signal is selected as the output signal, and
   in the presence of the first blemish signal the stored video signal is normally substituted therefor, and
   suppression means responsive to the stored blemish signal to control the selection means to suppress substitution of the stored video signal into the input video signal.

2. Apparatus according to claim 1, in which the blemish signal storing means comprises means for inserting into the video store, in place of the input video signal, a flag comprising a reserved code indicating a blemish, and means at the store output of the video store for recognising the said code.

3. Apparatus according to claim 1, in which the blemish signal storing means comprises a separate flag store.

4. Apparatus according to claim 1, in which when the input video signal represents a region of one film frame the different film area is the same region of another film frame.

5. Apparatus according to claim 4, including a movement detector, and means arranged upon the detection of movement to suppress the said substitution.

6. Apparatus according to claim 1, including means for providing a third video signal corresponding to a third, different area of the film and means operable upon said suppression to substitute, instead the third video signal into the input video signal.

7. Apparatus according to claim 6, in which the third area is an adjacent area of the same film frame.

8. Apparatus according to claim 6, in which the information is generated by interpolation across said third area.

9. Apparatus according to claim 1, in which the selection means is preceded by a first selected stage operable in response to the blemish signals to effect substitution of substantially all areas indicated as blemished, the selection means being arranged in the event that it becomes overloaded, to allow information substituted by the first stage to remain.

10. A telecine machine provided with apparatus for concealing film blemishes in a video signal generated by said machine, said apparatus comprising:
    input means for receiving an input video signal representative of successive film area;
    blemish signal deriving means for deriving blemish signals indicating a blemish on a region of a film frame represented by the input video signal;
    means for providing a substitute video signal corresponding to the same region of another film frame;
    substitution means responsive to the blemish signals to substitute the substitute video signal into the input video signal;
    a movement detector coupled to the input means for detecting movement in the scene between the two film frames; and
    means coupled between the movement detector and the substitution means and arranged upon the detection of movement to suppress the said substitution.

11. Apparatus according to claim 10, including means for providing a third video signal corresponding to a third, different region of the film, and means operable upon said suppression to substitute, instead, the third video signal into the input video signal.

12. Apparatus according to claim 11, in which the third area is an adjacent area of the same film frame.

13. Apparatus according to claim 11, in which the information is generated by interpolation across said third area of the area of the blemish.

14. A method of concealing film blemishes in a telecine machine which provides an input video signal, comprising the steps of:
    storing a part of the input video signal to provide a stored video signal,
    deriving a first blemish signal associated with the input video signal and indicating the presence of a blemish on the film,
    storing the first blemish signal to provide a stored blemish signal associated with the stored video signal, and providing an output signal in dependence upon the first blemish signal and the stored blemish signal, in which in the absence of one of the blemish signals the video signal associated with the absent blemish signal is selected as the output signal, in the presence of the said one of the blemish signals the video signal associated with the other blemish signal, representing information from a different area of the film, or a signal derived therefrom is substituted therefor, and in the presence of the other of the blemish signals any such substitution is suppressed.

15. A method of concealing film blemishes in a telecine machine, comprising the steps of:
storing a part of an input video signal representing a region of a film frame represented by the video signal;
deriving a blemish signal associated with the input video signal and indicating the presence of a blemish on the same region of another film frame;
detecting movement in the scene between the two film frames;
substituting in response to the blemish signal the stored video signal into the input video signal; and
suppressing the said substitution in response to the detection of movement by the movement detector.

16. Apparatus for concealing defects in a video signal, comprising:
input means for reserving an input video signal representing an image area;
video store means coupled to said input means for storing the input signal to provide a stored video signal representing a different image area;
defect signal deriving means for deriving a first defect signal indicating the presence of a defect on the image area represented by the input video signal;
defect signal storing means for storing a first defect signal to provide a second stored defect signal associated with the stored video signal; and
selection means for providing an output video signal in dependence upon said first defect signal, said selection means being operative such that:
in the absence of said first defect signal the input signal is selected as the output signal; and
in the presence of said first defect signal the stored video signal is normally substituted therefor; and
suppression means responsive to the second defect signal to control the selection means to suppress substitution of the stored video signal into the input video signal.

17. Apparatus for concealing defects in a video signal, comprising:
input means for receiving in input video signal comprising successive video pictures;
defect signal deriving means for deriving defect signals indicating a defect on a region of the picture represented by the input video signal;
means for providing a substitute video signal corresponding to the same region of another film frame;
substitution means responsive to the defect signals to substitute the substitute video signal into the input video signal;
a movement detector coupled to the input means for detecting movement in the scene between the two pictures; and
means coupled between the movement detector and the substitution means and arranged upon the detection of movement to suppress the said substitution.

18. A method according to claim 14, including the step of substituting, instead, information derived from a third area of the film.

19. Apparatus according to claim 16, in which said video signal is provided from a videotape recorder and including a dropout detector for providing said defect signals.

20. A method according to claim 15, including the steps of providing a further video signal corresponding to a third, different region of the film, and, when the said substitution is suppressed, substituting, instead, the third video signal.

21. Apparatus according to claim 17, in which said video signal is provided from a videotape recorder and including a dropout detector for providing said defect signals.

22. Apparatus according to claim 10, in which the selection means is preceded by a first selected stage operable in response to the blemish signals to effect substitution of substantially all areas indicated as blemished, the selection means being arranged in the event that it becomes overloaded, to allow the information substituted by the first stage to remain.

23. A method according to claim 14, in which when the input video signal represents a region of one film frame the different film area is the same region of another film frame.

24. A method according to claim 23, including the step of suppressing such substitution when motion is detected.

* * * * *